United States Patent

[11] 3,622,892

[72] Inventor Richard E. Lunquist
Chicago, Ill.
[21] Appl. No. 63,652
[22] Filed Aug. 13, 1970
[45] Patented Nov. 23, 1971
[73] Assignee Motorola, Inc.
Franklin Park, Ill.
Continuation of application Ser. No. 803,317, Feb. 28, 1969. This application Aug. 13, 1970, Ser. No. 63,652

[54] SINGLE POLE MULTIFREQUENCY SELECTIVE SQUELCH
10 Claims, 1 Drawing Fig.

[52] U.S. Cl. .......... 325/456, 325/348, 325/392, 325/432, 325/439, 325/452, 325/478, 325/468, 331/161
[51] Int. Cl. .......... H04b 1/10
[50] Field of Search .......... 325/55, 56, 64, 302, 348, 392, 402–404, 432, 439, 452, 453, 478, 468, 464, 465, 456; 343/225, 228; 331/161

[56] References Cited
UNITED STATES PATENTS

| | | | |
|---|---|---|---|
| 3,250,999 | 5/1966 | Cole | 325/348 |
| 3,482,166 | 12/1969 | Gleason | 325/468 |

*Primary Examiner*—Robert L. Griffin
*Assistant Examiner*—Albert J. Mayer
*Attorney*—Mueller and Aichele

ABSTRACT: A single pole multicontact switch is used to selectively connect different crystals to an oscillator to vary the frequency of the oscillator. The crystal circuits include a direct current path and each crystal circuit is coupled to one of a pair of contacts of the switch through a direct current conductive path and to the other of the pair of contacts through a direct current blocking path. A squelch circuit is provided with a bias circuit connected thereto and to the single pole switch. The bias circuit acts to render the squelch circuit selectively operative or inoperative according to the path through which the crystal is connected to the crystal oscillator.

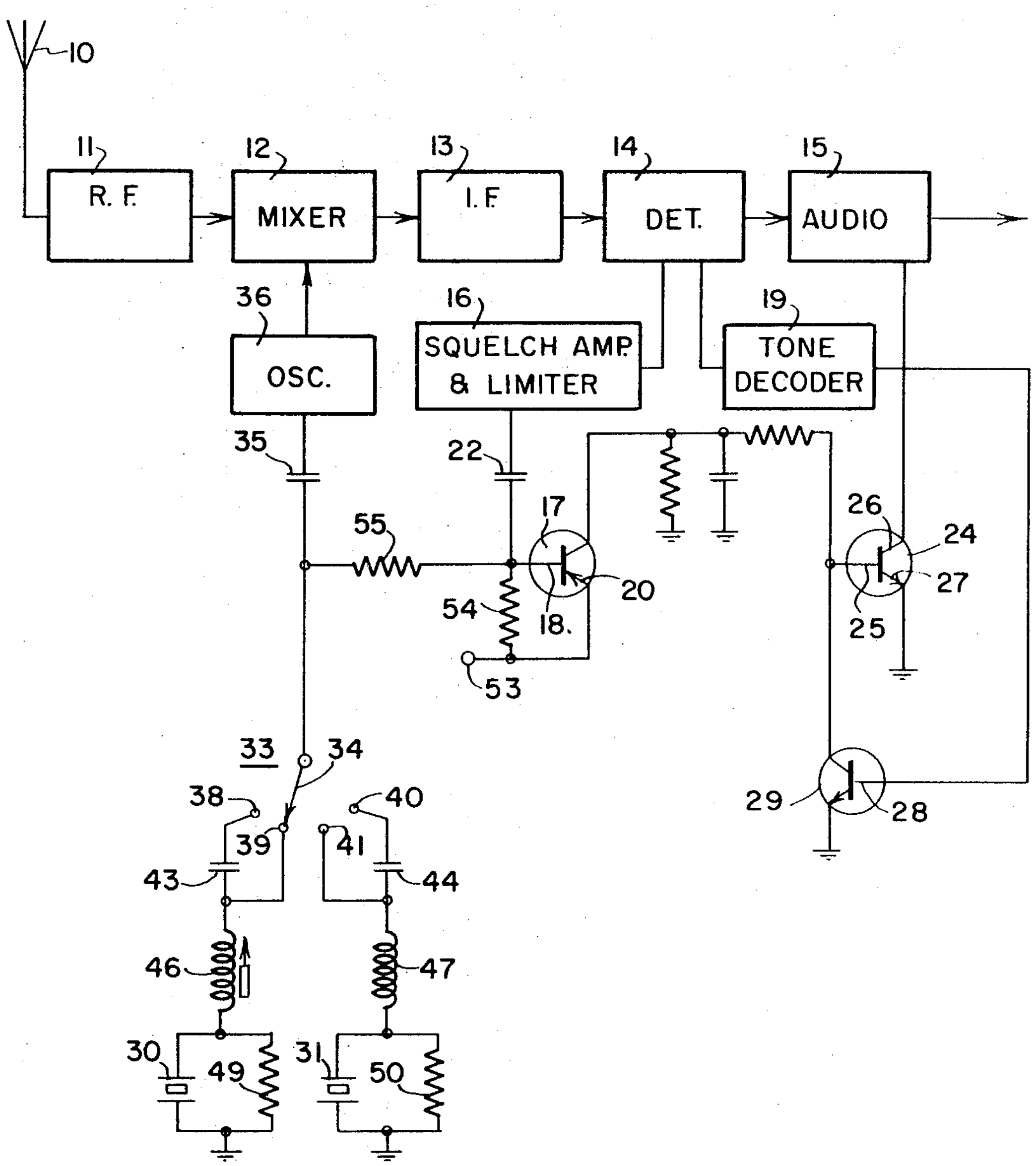
Inventor
RICHARD E. LUNQUIST
BY Mueller, Aichele & Rauner
Attys.

SINGLE POLE MULTIFREQUENCY SELECTIVE SQUELCH

This application is a continuation of U.S. Pat. application Ser. No. 803,317 filed Feb. 28, 1969.

BACKGROUND OF THE INVENTION

In recent years the availability of transistors and integrated circuits has permitted a great reduction in size of electronic communication equipment. Transmitters and receivers have been built which are easily held in the hand and operate from a battery power source. While the size of the radio equipment has decreased dramatically, the complexity of a small battery-powered receiver has remained the same or has increased. Thus commercial receivers are available which operate on more than one frequency, as desired, and in addition have the feature of a selective tone-coded squelch system as well as the regular noise-operated squelch systems.

When both of these features are combined in a single receiver it is necessary to provide a switch to select the desired frequency and also to provide a switch through which the selective squelch system can be turned on and off. With larger type receivers, the size of the receiver has permitted two or more separate switches to perform these functions.

However, as the size of the receivers decreases, the use of separate switches is undesirable and in some cases not feasible since the size of the housing has reached the point where it is difficult to find room thereon for a large number of controls. A single switch could be used with separate contact arms thereon but this involves increased cost in manufacture and also requires a larger switch than would be required since a second switch deck is necessary. With the extremely small size of present day commercially available transmitter and receiver units the addition of the extra switch deck presents a substantial problem in the packaging of the unit.

SUMMARY OF THE INVENTION

It is, therefore, an object of this invention to provide an improved switching circuit for selecting one of a plurality of frequencies and further for selecting a noise-operated squelch or a coded signal-operated squelch as desired.

Another object of this invention is to provide a switching circuit using a single switch for selectively choosing between a plurality of operating frequencies and a selective or nonselective squelch.

In practicing this invention a single pole multiposition switch is provided having a pair of positions for each frequency to be selected. A bias circuit connected to a first reference potential is provided for the selective squelch system of the receiver. The contact arm of the switch is connected to the bias circuit through a direct current conductive path and to the receiver oscillator by a direct current blocking path. The crystal circuits which are to be selectively coupled to the oscillator include a direct current path to a second reference potential. The output of each crystal circuit is coupled to a first contact of the pair through a direct current blocking path and to a second contact of the pair through a direct current conductive path. Thus, when the contact arm is connected to the first contact there is no direct current path between the first and second reference potentials through the bias circuit means and the bias circuit means is in a first state. With the contact arm connected to the second contact of the pair the crystal circuit connected to the oscillator remains the same and a direct current path is provided between the first and second reference potentials through the crystal circuit, the switch and the bias circuit means to place the bias circuit means in a second state. The squelch circuit is responsive to one of the first and second states to operate as a selective squelch and responsive to the other of the first and second states to operate as a nonselective squelch.

The invention is illustrated in the single drawing, a partial block diagram and partial schematic of the circuit incorporating the features of this invention.

DETAILED DESCRIPTION OF THE INVENTION

The FIGURE is a partial schematic and partial block diagram of a radio receiver incorporating the features of this invention. Signals received by antenna 10 are amplified in amplifier 11 and mixed with a frequency from oscillator 36 in mixer 12. The resulting IF frequency is amplified by amplifier 13 and detected in discriminator 14. The detected signal is coupled to audio circuitry 15 for use thereby. The output of detector 14 is also coupled to the squelch amplifier and limiter 16. The output of squelch amplifier and limiter 16 is coupled to base 18 of transistor 17 through capacitor 22 to operate the noise squelch circuit in a known manner. When a correct selective tone-coded signal is present at discriminator 14 it is detected by tone decoder 19 to develop a bias signal which is coupled to base 28 of transistor 29.

Oscillator 36 is adapted to oscillate at a plurality of frequencies according to the crystal selected by switch 33. In this example two crystals are shown, however, the circuit may include more if desired. Crystal 30 can be coupled to oscillator 36 through inductance 46, capacitor 43, contact 38, switch arm 34 and capacitor 35. The connecting path between crystal 30 and oscillator 36 can also bypass capacitor 43 if switch arm 34 is connected to contact 39. If contact arm 34 is connected to contact 40, crystal 31 is connected to oscillator 36 through inductance 47, capacitance 44, switch arm 34 and capacitor 35. Again if switch arm 34 is connected to contact 41, crystal 31 is connected to oscillator 36 with the connecting path bypassing capacitor 44.

A bias circuit is provided for the squelch circuit and consists of resistors 54 and 55 connected between a positive potential at terminal 53 and ground through switch 33 and one of the oscillator circuits. When contact arm 34 is connected to contact 39 a direct current path exists between terminal 53 and ground through resistor 54, resistor 55, contact arm 34, contact 39, inductance 46 and resistor 49. If contact arm 34 is connected to contact 41 a similar direct current path exists through inductor 47 and resistor 50. Thus with switch 33 having contact arm 34 connected to either contact 39 or 41, current flows through resistor 54 biasing transistor 17 to conduction.

With switch arm 34 connected to position 38 or 40, the amplified noise signal applied to base 18 of transistor 17 biases transistor 17 to conduction. With transistor 17 biased to conduction a positive potential is applied to base 25 of transistor 24 biasing transistor 24 to saturation. With transistor 24 saturated, audio signals are shunted to ground through collector 26 and emitter 27 to prevent audio signals from being reproduced by the audio circuitry. If a desired signal is received the noise signal appearing on base 18 of transistor 17 is reduced so that transistor 17 is biased to nonconduction. With transistor 17 biased to nonconduction the potential on base 25 of transistor 24 is reduced to ground potential and transistor 24 is biased to nonconduction. This removes the shunt across the audio circuit and audio signals are reproduced.

If a tone-coded squelch signal of the proper frequency is received the tone decoder 19 develops a signal which is coupled to base 28 of transistor 29. This signal biases transistor 29 to saturation so that the bias signal on base 25 of transistor 24 is clamped at ground potential to bias transistor 24 to nonconduction to remove the shunt from the audio signal circuitry. Thus by choosing between contacts 38 and 40 the desired crystal frequency can be selected and the squelch system is rendered operable on both the tone-coded squelch signal and noise signals.

With a switch arm 34 in positions 39 and 41 a permanent bias is applied to transistor 17 so that it is always biased to conduction. With transistor 17 biased to conduction at all times, transistor 24 is also biased to saturation to apply a shunt to the audio circuitry. In this condition the noise signals from squelch amplifier and limiter 16 will not act to change the conduction of transistor 17. However, a tone-coded squelch signal will bias transistor 29 to shunt the base of transistor 24 and thus the circuit will be responsive to tone-coded squelch signals.

Thus a simple selector switch and circuit is shown for choosing between a coded signal selective squelch and a normal noise-operated squelch and further for choosing a desired operating frequency. The circuit uses a single switch having only one contact arm to provide the desired features in a minimum amount of space and at a minimum cost.

I claim:

1. A radio device of the type to be carried in the hand and operated from a self-contained battery power source and further of the type to be selectively placed in an operating condition by the receipt of coded signals, including in combination, oscillator means for providing signals of a desired frequency, a plurality of crystal circuit means for controlling said desired frequency, each of said plurality of crystal circuit means being coupled to a first reference potential and having an output, with a direct current path from said output to said first reference potential through said crystal circuit means, squelch circuit means adapted to receive the coded signals and responsive thereto to selectively place the radio device in an operating condition, switch means having a single pole and a plurality of pairs of contacts equal in number to said plurality of crystal circuit means, first direct current blocking means coupling said single pole to said oscillator means, bias circuit means coupled to a second reference potential and to said squelch circuit means and having a first state to render said squelch circuit means responsive only to the coded signals and a second state, first direct current conductive means coupling said single pole to said bias circuit means, a plurality of second direct current blocking means each coupling one contact of each of said plurality of pairs of contacts to an output of a separate one of said crystal circuit means, a plurality of second direct current conductive means each coupling the other contact of each of said plurality of pairs of contacts to an output of a separate one of said crystal circuit means, said bias circuit means being responsive to the direct current path provided between said first and second reference potentials with said single pole connected to any of said other contacts to be placed in one of said first and second states, said bias circuit means being responsive to said single pole being connected to any of said one contacts to be placed in the other of said first and second states.

2. The radio device of claim 1 wherein, said plurality of crystal circuit means include first and second crystal circuit means and said plurality of pairs of contacts include first and second contacts forming a first pair of contacts and third and fourth contacts forming a second pair of contacts, one of said plurality of said second direct current blocking means coupling said first contact to said output of said first crystal circuit means and a separate one of said second direct current blocking means coupling said fourth contact to said output of said second crystal circuit means, one of said plurality of said direct current conducting means coupling said second contact to said output of said first crystal circuit means and another one of said plurality of said direct current conductive means coupling said third contact to said output of said second crystal circuit means.

3. The radio device of claim 2 wherein, said first direct current blocking means and said plurality of second direct current blocking means are capacitors.

4. The radio device of claim 3 wherein, said bias circuit means includes first and second resistance means coupled between said second reference potential and said single pole.

5. The radio device of claim 4 wherein, said squelch circuit means includes a transistor having a base electrode coupled to the junction of said first resistance means and said second resistance means, and an emitter electrode coupled to said second reference potential whereby current flows through said first and second resistance means with said single pole in contact with one of said second and third contacts to bias said transistor to conduction, and whereby current is blocked from flowing through said first and second resistance means with said single pole connected to one of said first and fourth contacts to bias said transistor to nonconduction.

6. The radio device of claim 5 wherein, each of said first and second crystal circuit means includes, third resistance means and crystal means coupled in parallel and to said first reference potential, and inductance means coupling said third resistance means and said crystal means to said crystal circuit means output, said inductance means and said third resistance means forming said direct current path from said output to said first reference potential.

7. A radio device of the type to be carried in the hand and operated from a self-contained battery power source, and further of the type to be selectively placed in a reproducing condition, such device including in combination, oscillator means for providing signals of a desired frequency, a plurality of frequency controlling circuit means for controlling said desired frequency, each of said plurality of circuit means being coupled to a reference potential and having an output conductor, and having a direct current path through said circuit means from said reference potential to said output conductor, squelch circuit means responsive to received signals to selectively place the radio device in a reproducing condition, switch means having a single pole and a plurality of pairs of contacts equal in number to said plurality of circuit means, first direct current blocking means coupling said single pole of said switch means to said oscillator means, first direct current conductive means coupling said single pole of said switch means to said squelch circuit means, a plurality of second direct current blocking means each coupling one contact of each of said plurality of pairs of contacts to the output conductor of a separate one of said frequency controlling circuit means, a plurality of second direct current conductive means each coupling the other contact of each of said plurality of pairs of contacts to the output conductor of a separate one of said frequency controlling circuit means, said squelch circuit means being in a first state with said single pole connected to any of said one contacts and being responsive to the direct current path to said reference potential to operate to a second state with said single pole connected to any of said other contacts.

8. The radio device of claim 7 wherein each of said frequency control circuit means includes a piezoelectric crystal device and resistor means connected in parallel with each other between said reference potential and said output conductor.

9. The radio device of claim 8 wherein each of said frequency control circuit means includes inductor means connected in series with said crystal device and said resistor means thereof, and said inductor means and said resistor means form the direct current path through said frequency control circuit means.

10. The radio device of claim 8 wherein each of said second direct current blocking means is formed by a capacitor and each of said second direct current conductive means is formed by a conductor.

* * * * *